United States Patent

Marmonier et al.

[11] Patent Number: 5,828,540
[45] Date of Patent: Oct. 27, 1998

[54] METHOD OF PROTECTING AGAINST FAILURE OF A CIRCUIT BREAKER

[75] Inventors: Jean Marmonier, Aix les Bains; Hervé Lefort, La Grande Motte, both of France

[73] Assignee: Gec Alsthom T & D SA, Paris, France

[21] Appl. No.: 892,129

[22] Filed: Jul. 14, 1997

[30] Foreign Application Priority Data

Jul. 18, 1996 [FR] France .................................. 96 09012

[51] Int. Cl.$^6$ .................................................. H01H 71/46
[52] U.S. Cl. ........................... 361/195; 324/424; 340/638
[58] Field of Search ..................... 340/638, 639, 340/644; 324/424; 361/195, 160, 170

[56] References Cited

U.S. PATENT DOCUMENTS 3,156,848  11/1964  Wood ......................................... 361/51
4,620,156  10/1986  Alvin et al. .............................. 324/424
5,267,120  11/1993  Graff et al. .

FOREIGN PATENT DOCUMENTS

0538109A1  4/1993  European Pat. Off. .

Primary Examiner—Fritz Fleming
Attorney, Agent, or Firm—Sughrue, Mion, Zinn, Macpeak & Seas, PLLC

[57] ABSTRACT

The invention relates to a method of protecting against circuit breaker failure, said circuit breaker having contacts capable of moving between a closed position and an open position, and vice versa, and being fitted with protection apparatus including fault detector apparatus for putting into operation an opening electromagnetic coil that actuates circuit breaker contact drive apparatus, with position-indicator contacts of monitor apparatus being changed over as soon as the circuit breaker contacts start to move. According to the invention, in the event of a fault being detected, a time delay is generated from the indicator contacts changing over, and at the end of said time delay it is verified whether the fault current has become zero, and if not an alarm is generated.

2 Claims, 1 Drawing Sheet

METHOD OF PROTECTING AGAINST FAILURE OF A CIRCUIT BREAKER

FIELD OF THE INVENTION

The present invention relates to a method of protecting against failure of a circuit breaker, in particular a high voltage circuit breaker.

More particularly, the invention relates to a method of protecting against circuit breaker failure, said circuit breaker having contacts capable of moving between a closed position and an open position, and vice versa, and being fitted with protection apparatus including fault detector apparatus for putting into operation an opening electromagnetic coil that actuates circuit breaker contact drive apparatus, with position-indicator contacts of monitor apparatus being changed over as soon as the circuit breaker contacts start to move.

BACKGROUND OF THE INVENTION

An example of contact drive apparatus for a circuit breaker is described in patent document EP-0 221 430. Such drive apparatus is associated with monitoring apparatus in which the position of the circuit breaker contacts is monitored by means of position-indicator contacts.

Known methods for providing protection against circuit breaker failure consist in generating a time delay after an opening instruction has been sent to the opening electromagnetic coil of the circuit breaker which is actuated in the event of a fault being detected, and then in verifying whether the current is indeed zero at the end of the time delay. If the current is zero, then circuit breaking has been performed without problem; otherwise, a failure alarm is generated and circuit breakers adjacent to the failed circuit breaker are operated. The time delay is generally of the order of 150 ms to 200 ms and it makes it possible to monitor for possible failure of the coil, of the entire drive initialization system of the circuit breaker, and of the moving high tension contacts of the circuit breaker per se.

The time delay is adjusted with a large margin to ensure that it does not terminate before the fault current has been interrupted in the event of the circuit breaker operating slowly, as explained in greater detail below.

That method provides good safety, but it requires a relatively long period before a failure alarm can be started in the event of a fault.

The invention provides a faster method of providing for detection against failure, which method is suitable for being associated with the above known method.

For this purpose, in the event of a fault being detected, a time delay is generated from the indicator contacts changing over, and at the end of said time delay it is verified whether the fault current has become zero, and if not an alarm is generated. The alarm is advantageously a "circuit breaker failure" signal.

The advantage of this method of providing protection against failure is the considerable reduction in the time required to clear a fault in the event of a circuit breaker failing to interrupt, thereby providing better stability for the network or grid.

Optimally, said time delay is greater than or equal to the sum of the time between the position-indicator contacts changing over and the circuit breaker contacts separating in the open position, plus the maximum acceptable arcing time.

The acceptable arcing time is the arcing time defined as a function of the circuit breaker. If the circuit breaker has not interrupted the current within the acceptable time, then the circuit breaker is assumed to be incapable of interrupting the current subsequently.

BRIEF DESCRIPTION OF THE DRAWING

The invention is described below in greater detail with reference to the figures which relate to a preferred embodiment of the invention.

MORE DETAILED DESCRIPTION

Figure 1:
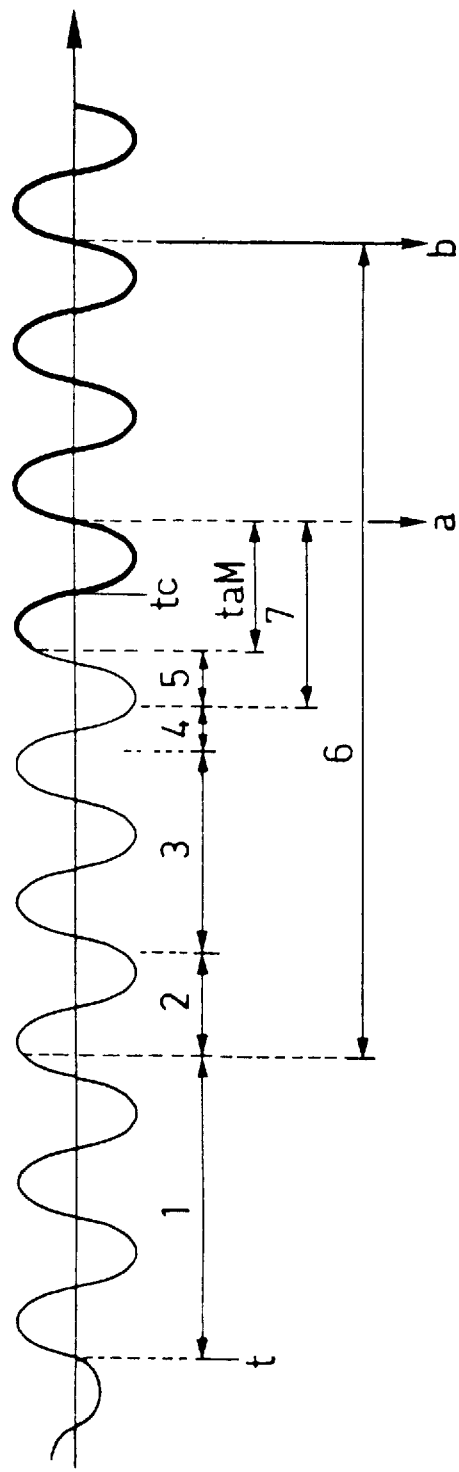
FIGS. 1 and 2 are both graphs illustrating the method of the invention.
Figure 2:
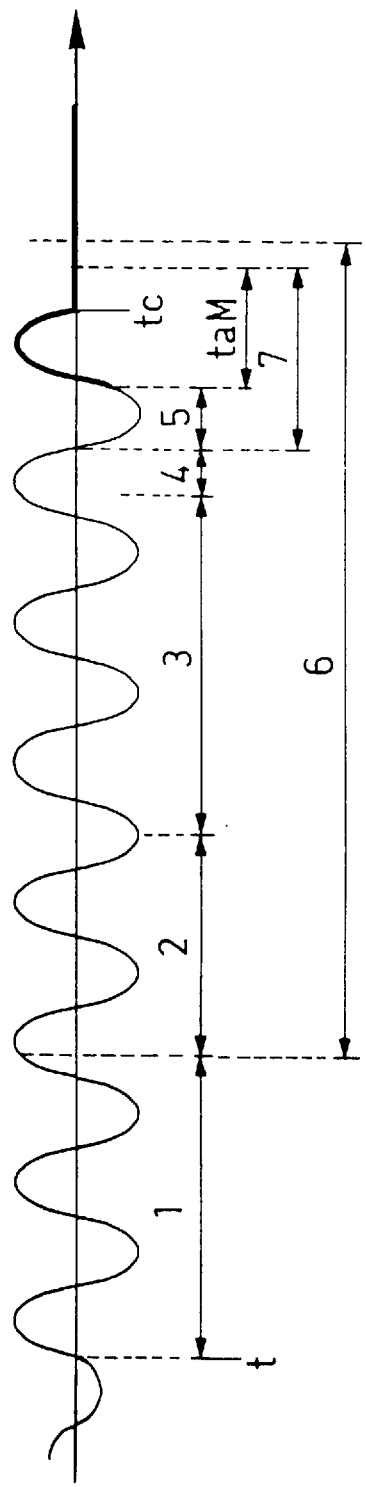

In the figures, current is plotted as a function of time. FIG. 1 corresponds to normal operating time for a circuit breaker and to a fault current not being interrupted. FIG. 2 corresponds to a slow operating time for the circuit breaker, but with proper interruption of the fault current.

A fault appears at instant t, and a period 1 is necessary to allow said fault to be detected by the protection apparatus. The apparatus then actuates an electromagnetic circuit breaker opening coil which takes time 2 to operate and whose electromagnet actuates the contact drive apparatus of the circuit breaker which comes into operation after a period 3. The contacts of the circuit breaker begin to move and the position-indicator contacts of the monitoring apparatus change state after a period 4. Thereafter the circuit breaker contacts are separated in the open position after time 5.

The conventional failure protection method consists in generating a time delay 6 starting from the coil being actuated. This time delay is generally of the order of 150 ms to 200 ms, and at instant b verification is performed to check whether or not the current is zero.

In the example shown in FIG. 1, the current is not zero. Since the fault current has not been interrupted, a "circuit breaker failure" signal is generated and safety precautions are taken, which in general means that adjacent circuit breakers are triggered.

In the example shown in FIG. 2, the fault current is interrupted at instant b. The circuit breaker has operated properly.

Since the time delay 6 takes account of the possibility of the circuit breaker operating slowly, as shown in FIG. 2, where slow operation due to delays between the opening instruction being issued and the contacts of the circuit breaker moving, e.g. because the circuit breaker has not been operated for a long time, or because of the cold, or because the power supply voltage applied to the coils is low, a relatively long period exists, in the event of normal operation, between the contacts of the circuit breaker separating and the alarm instant b.

In accordance with the invention, protection is provided that can be said to be "accelerated".

In the protection method, a time delay 7 is generated after the signalling contacts have changed state, i.e. at the end of time 4. At the end of this time delay, at instant a, a check is made to see whether the fault current is zero. The time delay 7 is greater than or equal to the sum of the time 5 between the contacts changing state and separation of the circuit breaker contacts in the opening position, plus the maximum acceptable arcing time taM.

The method makes it possible to monitor interruption with a time delay that is much finer than that possible with the conventional method. The alarm instant occurs at the end of a period of about 10 ms after the ideal current-interruption instant tc instead of 50 ms thereafter as is the case with conventional detection protection.

This time delay after the position-indicator contacts have changed state can be adjusted to a small value without a large safety margin, because the time 5 between said changeover and the circuit breaker contacts separating in the opening position is substantially constant, given that the indicator contacts act in positive manner and separation speed dispersion after the indicator contacts are up to speed is small.

Advantageously, the protection method is associated with a conventional protection method for providing protection in the event of misoperation of the opening electromagnetic coil.

We claim:

1. A method of protecting against circuit breaker failure, said circuit breaker having contacts capable of moving between a closed position and an open position, and vice versa, and being fitted with protection apparatus including fault detector apparatus for putting into operation an opening electromagnetic coil that actuates circuit breaker contact drive apparatus to separate the circuit breaker contacts to their open position, with position-indicator contacts of monitor apparatus being changed over as soon as the circuit breaker contacts start to move, said circuit breaker having a maximum acceptable arc time associated therewith and conducting a non-zero current, wherein said method comprises:

detecting a fault;
   generating a time delay from the time the indicator contacts change over;
   verifying, at the end of said time delay, whether the current conducted by the circuit breaker has become zero; and
   generating an alarm if the current conducted by the circuit breaker is not zero.

2. A method according to claim 1, wherein said step of generating a time delay comprises generating a time delay that is greater than or equal to the sum of the time between when the position-indicator contacts change over and when the circuit breaker contacts separate to their open position, plus the maximum acceptable arcing time.

* * * * *